US 11,994,592 B2

(12) United States Patent
Qian

(10) Patent No.: US 11,994,592 B2
(45) Date of Patent: May 28, 2024

(54) LIDAR-BASED UNMANNED VEHICLE TESTING METHOD AND APPARATUS

(71) Applicant: Venti Technologies Corporation, Weston, MA (US)

(72) Inventor: Pengcheng Qian, Suzhou (CN)

(73) Assignee: Venti Technologies Corporation, Weston, MA (US)

(*) Notice: Subject to any disclaimer, the term of this patent is extended or adjusted under 35 U.S.C. 154(b) by 401 days.

(21) Appl. No.: 17/407,053

(22) Filed: Aug. 19, 2021

(65) Prior Publication Data

US 2022/0043158 A1    Feb. 10, 2022

Related U.S. Application Data

(63) Continuation of application No. PCT/CN2019/115963, filed on Nov. 6, 2019.

(30) Foreign Application Priority Data

Feb. 20, 2019   (CN) .......................... 201910127591.1

(51) Int. Cl.
   *G01S 17/931* (2020.01)
   *G01S 17/86* (2020.01)
   (Continued)

(52) U.S. Cl.
   CPC ............ *G01S 17/931* (2020.01); *G01S 17/86* (2020.01); *G05D 1/024* (2013.01); *G06T 7/20* (2013.01); *G06T 2207/10028* (2013.01)

(58) Field of Classification Search
   CPC ........ G01S 17/931; G01S 17/86; G01S 17/89; G05D 1/024; G05D 2201/0213;
   (Continued)

(56) References Cited

U.S. PATENT DOCUMENTS 11,681,291 B2 *   6/2023   Shashua ............. G08G 1/09623
                                                        701/423
2009/0201486 A1   8/2009   Cramblitt et al.
(Continued)

FOREIGN PATENT DOCUMENTS

CN          106289797 A       1/2017
CN          106769080 A       5/2017
(Continued)

OTHER PUBLICATIONS

A 3D LiDAR Data-Based Dedicated Road Boundary Detection Algorithm for Autonomous Vehicles—Jan. 2019 (Year: 2019).*
(Continued)

*Primary Examiner* — Nizar N Sivji
(74) *Attorney, Agent, or Firm* — Womble Bond Dickinson (US) LLP

(57) ABSTRACT

A lidar-based unmanned vehicle testing method, the method comprising: acquiring vehicle movement information and point cloud data collected by lidar, the vehicle movement information comprising movement of the vehicle during the vehicle driving process; if the movement of the vehicle is a preset movement then, on the basis of the point cloud data and a map, acquiring road information of the test road on which the vehicle is located; on the basis of the preset movement and the road information, acquiring a performance index of the vehicle; and, on the basis of the vehicle movement information and the performance index, determining a vehicle performance test result.

18 Claims, 7 Drawing Sheets

(51) Int. Cl.
*G05D 1/00* (2024.01)
*G06T 7/20* (2017.01)

(58) Field of Classification Search
CPC .................. G05D 1/0274; G06T 7/20; G06T 2207/10028; G01C 21/3697; G01M 17/007
See application file for complete search history.

(56) References Cited

U.S. PATENT DOCUMENTS

| | | |
|---|---|---|
| 2017/0344015 A1 | 11/2017 | Zhang |
| 2018/0313724 A1* | 11/2018 | Yang ..................... G06F 18/217 |
| 2019/0009789 A1* | 1/2019 | Zhang .................. G06V 20/588 |
| 2020/0081094 A1* | 3/2020 | Furukawa ............. G01S 7/4876 |
| 2021/0271254 A1* | 9/2021 | Chen ...................... B62D 15/02 |

FOREIGN PATENT DOCUMENTS

| | | | | | |
|---|---|---|---|---|---|
| CN | 108347691 | A | | 7/2018 | |
| CN | 109214248 | A | | 1/2019 | |
| CN | 109668742 | A | | 4/2019 | |
| CN | 110620632 | A | * | 12/2019 | ............ G04R 40/06 |
| CN | 113126115 | A | * | 7/2021 | |
| CN | 115993825 | A | * | 4/2023 | |
| EP | 2922033 | A1 | | 9/2015 | |
| JP | 2020050337 | A | * | 4/2020 | ........... G01C 21/005 |

OTHER PUBLICATIONS

LiDAR-Video Driving Dataset: Learning Driving Policies Effectively—2018 (Year: 2018).*
International Searching Authority, International Search Report mailed on Jan. 23, 2020, for International Patent Application No. PCT/CN2019/115963.

* cited by examiner

LIDAR-BASED UNMANNED VEHICLE TESTING METHOD AND APPARATUS

CROSS-REFERENCE TO RELATED APPLICATION

This application is a continuation application of International Application No. PCT/CN2019/115963, filed on Nov. 6, 2019, which claims priority to Chinese Application No. 20191012759.1, filed on Feb. 20, 2019, both of which are incorporated by reference herein.

TECHNICAL FIELD

The present disclosure relates to the field of vehicle testing technologies, and in particular, to a method and a device for testing an unmanned vehicle based on a laser radar.

BACKGROUND

Vehicles are becoming increasingly popular, the demand for vehicles is still growing, and buyers are paying increasing attention to vehicle quality, which makes vehicle manufacturers pay increasing attention to improving vehicle performance, such as control performance and durability. In general, a vehicle can be launched on the market only after passing a test. Therefore, the test of the vehicle is an important link for testing the vehicle performance or durability, and has important guiding significance for the subsequent production of the vehicle. In order to ensure that the vehicles launched on the market are vehicles with high quality, test of the vehicles becomes increasingly important.

The current vehicle test is carried out in a manual driving mode. Consequently, not only manpower is consumed, but also the defects such as test item incompletion and test inaccuracy may exist.

SUMMARY

In view of above, the present disclosure provides a method and a device for testing an unmanned vehicle based on a laser radar.

According to one aspect of the present disclosure, there is provided a method for testing an unmanned vehicle based on a laser radar, including: acquiring point cloud data collected by a laser radar and vehicle motion information, the vehicle motion information including a motion of the vehicle during travel; acquiring road information of a test road where the vehicle is located according to the point cloud data and a map in response to the motion of the vehicle being a preset motion; acquiring a performance indicator of the vehicle according to the preset motion and the road information; and determining a vehicle performance test result according to the vehicle motion information and the performance indicator.

According to another aspect of the present disclosure, there is provided a device for testing an unmanned vehicle device based on a laser radar, including: a processor; and a memory configured to store processor-executable instructions, wherein the processor is configured to execute the above method.

According to another aspect of the present disclosure, there is provided a non-volatile computer-readable storage medium, storing computer program instructions therein, wherein the computer program instructions, when executed by a processor, implement the above method.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of this specification, illustrate exemplary embodiments, features, and aspects of the present disclosure and, together with the specification, serve to explain the principles of the present disclosure.

DETAILED DESCRIPTION

Figure 1:
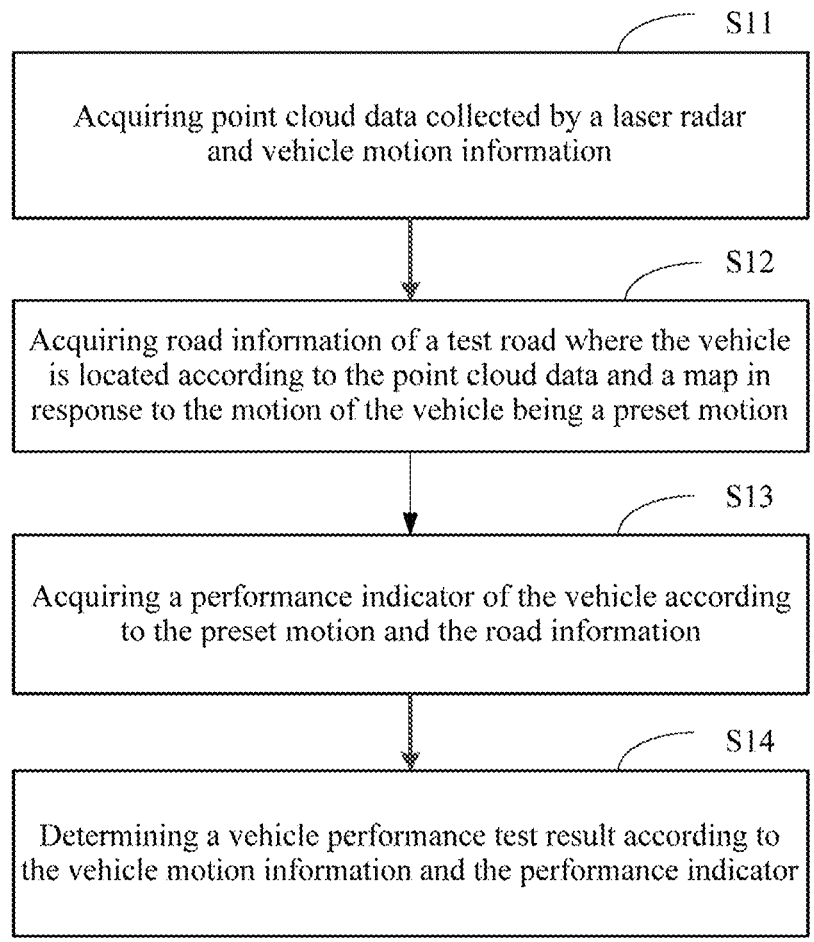
FIG. 1 illustrates a flowchart of a method for testing an unmanned vehicle based on a laser radar according to an embodiment of the present disclosure.

Various exemplary embodiments, features, and aspects of the present disclosure are described in detail below with reference to the accompanying drawings. Like reference symbols in the drawings indicate functionally identical or similar elements. While various aspects of the embodiments are shown in the drawings, the drawings are not necessarily drawn to scale unless otherwise indicated.

The word "exemplary" is used exclusively herein to mean "serving as an example, embodiment, or illustration". Any embodiment described herein as "exemplary" is not necessarily to be construed as preferred or advantageous over other embodiments.

Furthermore, in the following detailed description, numerous specific details are set forth in order to provide a better understanding of the present disclosure. It will be understood by a person skilled in the art that the present disclosure may be implemented without some of the specific details. In some instances, methods, means, elements, and circuits well known to a person skilled in the art have not been described in detail so as not to obscure the subject matter of the present disclosure.

FIG. 1 illustrates a flowchart of a method for testing an unmanned vehicle based on a laser radar according to an embodiment of the present disclosure. As shown in FIG. 1, the method may include:

Step S11 of acquiring point cloud data collected by a laser radar and vehicle motion information.

The vehicle test may be carried out in a vehicle testing ground where a test road for testing a vehicle may be included. The test road may be preset. For example, according to a test road for an existing vehicle durability test, the test road may be preset in the vehicle testing ground. The test road is not limited in the present disclosure, provided that the test road can be used to test vehicles. The vehicle test may include a vehicle performance test, a vehicle durability test, and the like.

The vehicle test may be a test of an unmanned vehicle, that is, the test of the vehicle does not require manpower and the vehicle is in an unmanned driving state. In order to ensure that the unmanned vehicle travels smoothly on the test road, one or more laser radars may be mounted on the unmanned vehicle, or a camera or another sensing device may be also mounted to implement functions of avoiding obstacles or locating, and the like. The location of the laser radar, the camera, or another sensing device on the vehicle is not limited, provided that the smooth travel of unmanned driving can be ensured.

The vehicle motion information may include a motion of the vehicle during travel, and the motion of the vehicle may include an operation motion of the vehicle, for example, a quick brake, a quarter turn, or direction light toggling, or may include a body motion of the vehicle, for example, a vibration of the body.

In the traveling process of the vehicle, the laser radar on the vehicle may collect point cloud data, such as environmental point cloud data or vehicle point cloud data, and a test platform (which may be referred to as a test control system) may acquire the point cloud data from the laser radar and may acquire vehicle motion information in real time. The test platform may be a computer or the like, the test platform may be disposed in a monitoring room of a vehicle testing ground, and the test platform may communicate with the laser radar and the vehicle in a wireless manner.

Step S12 of acquiring road information of a test road where the vehicle is located according to the point cloud data and a map in response to the motion of the vehicle being a preset motion.

The preset motion may be preset according to a test target. For example, the test target may be power of the to-be-tested vehicle, and the preset motion may be an acceleration.

The map may be a map of a vehicle testing ground, and may be described using point cloud data.

The test platform may determine whether the motion of the vehicle is the preset motion, for example, an acceleration. If the motion of the vehicle is the preset motion, matching may be searched for in the map according to the acquired point cloud data, and a location in the map corresponding to the point cloud data is acquired, i.e., the location is a location of the test road where the vehicle is located. The test road in the vehicle testing ground may be preset. For example, different road types, such as a rough road, a mountain road, a ramp, and a ring road, are disposed at different locations of the test road. That is, a correspondence between the locations on the test road and the road types already exists in advance.

The test platform may acquire the road information of a test road where the vehicle is located according to the location of the test road. For example, if the location of the test road where the vehicle is located is in a range of a mountain road, the road information of the test road where the vehicle is located may be acquired as the mountain road.

Step S13 of acquiring a performance indicator of the vehicle according to the preset motion and the road information.

The performance indicator of the vehicle may refer to an indicator that can describe power, safety, comfort, or the like of vehicle performance.

The correspondences among the preset motion, the road information, and the performance indicator of the vehicle may be preset before testing. For example, the correspondences may be written into a database for storage by a professional according to the performance indicators of vehicles of different models. For example, the correspondences may be stored in the following Table 1.

TABLE 1

| Vehicle type | Preset motion | Road information | Performance indicator of the vehicle |
|---|---|---|---|
| A | Acceleration | Mountain road | 10 seconds required for accelerating to 100 kilometers per hour |
| A | Acceleration | Highway | 7 seconds required for accelerating to 100 kilometers per hour |
| A | Emergency braking | Highway | 3 to 5 meters |
| B | Steering | Ring road | Steering radius a, steering angle b |

The above-mentioned Table 1 is merely an example of the correspondences among the preset motion, the road information, and the performance indicator of the vehicle. This is not limited in the present disclosure. A tester may set an item that the tester wants to test.

The test platform may acquire the performance indicator of the vehicle by searching the foregoing Table 1 according to the preset motion to which the vehicle motion information belongs and the road information.

Step S14 of determining a vehicle performance test result according to the vehicle motion information and the performance indicator.

The vehicle motion information may further include a motion parameter of the vehicle, such as a hundred kilometer acceleration duration of the vehicle or a vehicle vibration intensity.

The test platform may determine a vehicle performance test result according to the vehicle motion information and the performance indicator. For example, when the vehicle type A is tested, in response to the acquired motion of the vehicle being speeding up and the road information being a highway, the performance indicator may be acquired as 7 seconds by a look-up table. If the hundred kilometer acceleration duration in the vehicle motion information is 7 seconds, the vehicle performance test result may be determined as being qualified. The test result is only the test result for this time, and the final vehicle performance test result needs to be obtained by collecting statistics on a plurality of vehicle performance test results until the end of the test.

It should be noted that the test platform may further acquire a vehicle comfort performance related parameter or a vehicle control performance related parameter, to test vehicle comfort performance and control performance (response of the vehicle to control), and the like.

By replacing the conventional manual vehicle test mode with the unmanned vehicle test mode in the present disclosure, and ensuring normal travel in the vehicle test based on a laser radar, according to the method for testing an unmanned vehicle based on a laser radar in this embodiment of the present disclosure, unmanned automatic test of the vehicle can be implemented, manpower is saved, and comprehensiveness and accuracy of the test can be ensured.

In one possible implementation, the preset motion includes one or more of the following: acceleration, deceleration, emergency braking, steering, and the like; and the performance indicator includes one or more of the following: a power indicator, an emergency braking indicator, a control stability indicator, and the like.

In one possible implementation, the laser radar may be disposed on the vehicle, and there may be one or more laser radars, where an included angle between a laser direction of the laser radar and a horizontal plane may be of 0 to 50 degrees.

In one possible implementation, the laser direction of the laser radar is tilted downward by 10 degrees relative to the horizontal plane. Therefore, obstacles on the test road surface can be well tested, to ensure smooth traveling of the vehicle.

In one possible implementation, the unmanned vehicle may travel on the test road using a laser radar. For example, the unmanned vehicle may avoid obstacles according to the laser radar on the test road to complete travel on the test road;

Alternatively, the unmanned vehicle may travel on the test road according to preconfigured motion information, where the preconfigured motion information includes a speed and a steering angle corresponding to each location on the test road, or the preconfigured motion information includes a speed and a steering angle corresponding to each time period (time point) in a test.

Before the test, the unmanned vehicle may be configured with motion information. For example, the motion information, such as a speed, a steering angle, or an acceleration of each location on the test road may be stored on the unmanned vehicle. When the unmanned vehicle travels on the test road, a control module of the unmanned vehicle may obtain matched motion information from the stored motion information according to a current location; and control the unmanned vehicle to travel according to the motion information.

Optionally, the unmanned vehicle may be configured with a test mileage or a test duration before the test, and the unmanned vehicle control module may control the unmanned vehicle to stop the test according to the test mileage or the test duration.

Figure 2:
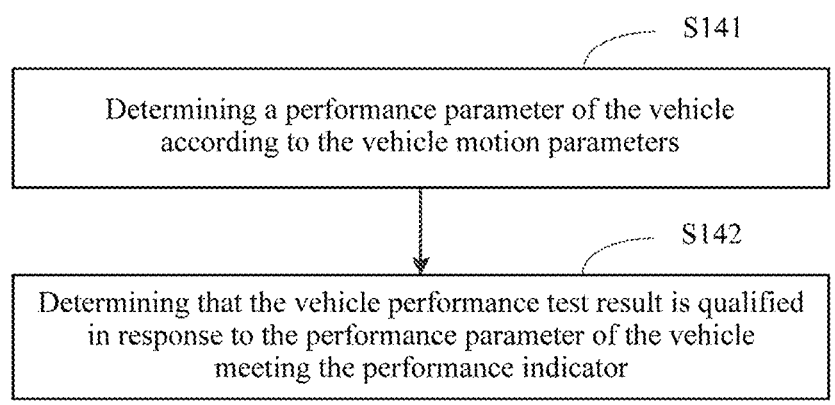
FIG. 2 illustrates a flowchart of step S14 according to an embodiment of the present disclosure.

FIG. 2 illustrates a flowchart of step S14 according to an embodiment of the present disclosure. As shown in FIG. 2, in one possible implementation, the vehicle motion information further includes a vehicle motion parameter. The step S14 may include: Step S141 of determining a performance parameter of the vehicle according to the vehicle motion parameters.

The vehicle motion parameters may include one or more of the following: a starting time of the preset motion, an ending time of the preset motion, a speed corresponding to the starting time, a speed corresponding to the ending time, a travel distance from the starting time to the ending time, a vehicle steering angle, or a vehicle steering radius. The vehicle motion parameter is not limited in the present disclosure, provided that the vehicle motion parameter can be used to calculate the performance of the vehicle.

The performance of the vehicle may include vehicle power performance, emergency braking performance, control performance, safety performance, comfort performance, and the like. Correspondingly, the performance parameter of the vehicle may refer to a parameter that represents the performance of the vehicle, and the performance parameter of the vehicle may include a vehicle power performance parameter, an emergency braking performance parameter, a steering performance parameter, a safety performance parameter, a comfort performance parameter, or the like.

For example, the motion of the vehicle is acceleration (hundred kilometer acceleration), and the corresponding vehicle motion parameter may include the starting time t1 of the hundred kilometer acceleration, the ending time t2 of the hundred kilometer acceleration, the vehicle speed 0 to 10 km/h at the starting time, and the vehicle speed 100 km/h at the ending time, and the test platform may determine that the power performance parameter of the vehicle is a hundred kilometer acceleration duration t2−t1.

Step S142 of determining that the vehicle performance test result is qualified in response to the performance parameter of the vehicle meeting the performance indicator.

If the performance indicator is acquired as 7 seconds by a look-up table, the test platform may determine whether the t2−t1 is within 7 seconds. If the t2−t1 is within 7 seconds, it may be determined that the vehicle performance is tested to be qualified, if the t2−t1 is not within 7 seconds, it may be determined that the performance of the vehicle is tested to be unqualified.

Alternatively, the test platform may record a result of each vehicle performance test.

Figure 3:
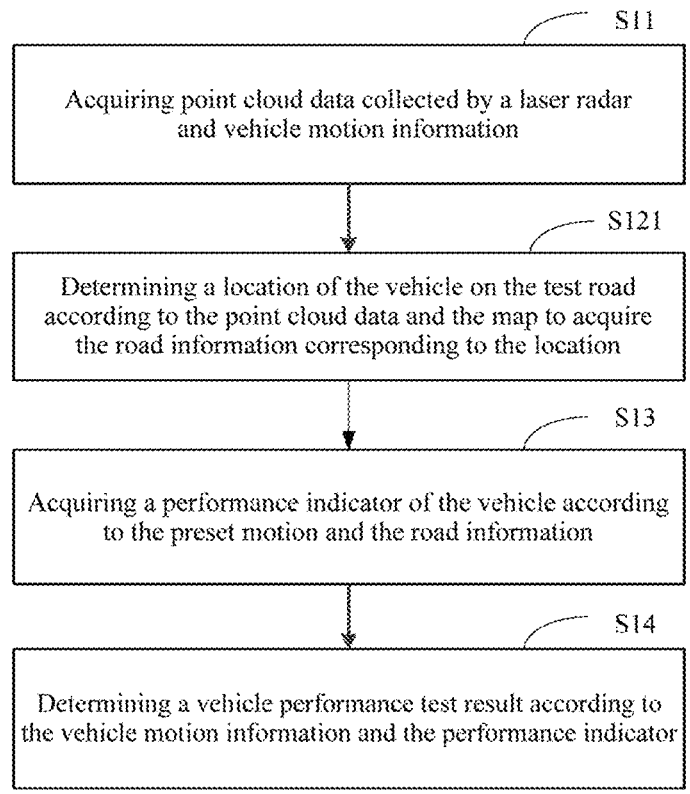
FIG. 3 illustrates a flowchart of a method for testing an unmanned vehicle based on a laser radar according to an embodiment of the present disclosure.

FIG. 3 illustrates a flowchart of a method for testing an unmanned vehicle based on a laser radar according to an embodiment of the present disclosure. As shown in FIG. 3, in one possible implementation, step S12 may include: Step S121 of determining a location of the vehicle on the test road according to the point cloud data and the map to acquire the road information corresponding to the location, where a correspondence between the road information and the location on the test road is preset, and the road information includes a road type. That is, a plurality of road types are set on the test road to be used for testing the vehicle, and which specific locations are correspondingly provided with which road types are known in advance. The road types may include a highway, a cobbled road, a fish scale pit road, a washboard road, a Belgian road, a rough road, a swinging road, a broken road, a square pit, a standard ramp, a ring road, and the like.

The test platform may determine the location of the vehicle on the test road according to the point cloud data and the map, and may acquire the road information corresponding to the location according to the correspondence between the road information and the location on the test road.

Figure 4:
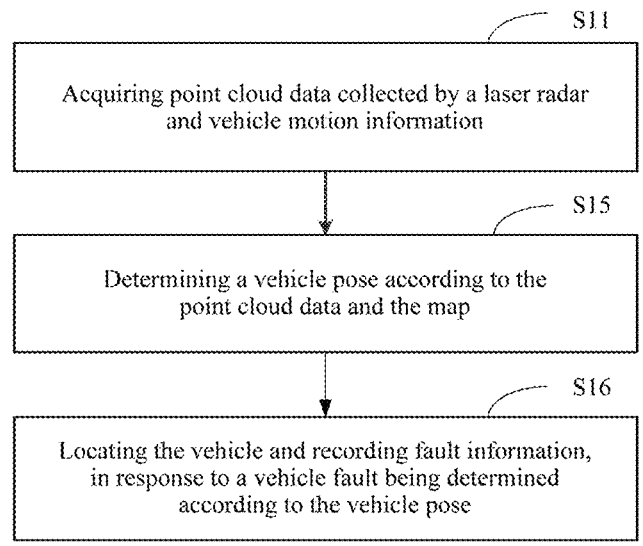
FIG. 4 illustrates a flowchart of a method for testing an unmanned vehicle based on a laser radar according to an embodiment of the present disclosure.

FIG. 4 illustrates a flowchart of a method for testing an unmanned vehicle based on a laser radar according to an embodiment of the present disclosure. As shown in FIG. 4, in one possible implementation, the method may further include: Step S15 of determining a vehicle pose according to the point cloud data and the map; and Step S16 of locating the vehicle and recording fault information, in response to a vehicle fault being determined according to the vehicle pose.

In the process of testing the unmanned vehicle, the test platform needs to acquire a measurement state in real time so as to ensure normal travel of the vehicle and avoid missing problems in the process of testing the vehicle, and the like. After acquiring the point cloud data, the test platform may further determine the vehicle pose, such as inclination or rollover according to the point cloud data and the map. If the vehicle fault is determined according to the vehicle pose, the vehicle may be located, and the fault information may be recorded. The fault information may include a faulty component, fault severity, or the like. The fault information may be used to determine a durability test result.

It should be noted that step S15 may be carried out after the point cloud data is acquired in step S11, without being affected by other steps, and may be carried out provided that the point cloud data is acquired.

Figure 5:
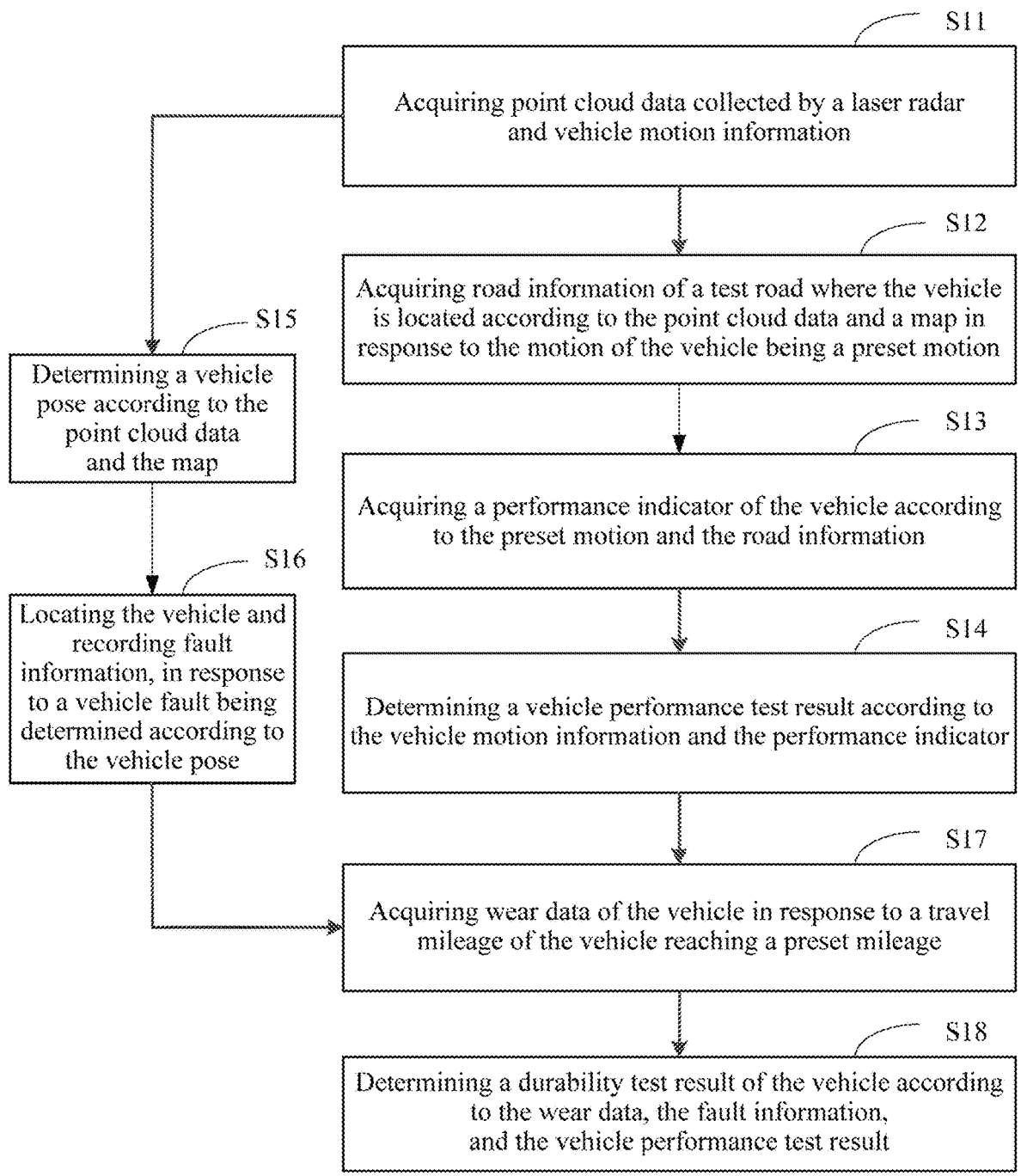
FIG. 5 illustrates a flowchart of a method for testing an unmanned vehicle based on a laser radar according to an embodiment of the present disclosure.

FIG. 5 illustrates a flowchart of a method for testing an unmanned vehicle based on a laser radar according to an embodiment of the present disclosure. As shown in FIG. 5, in one possible implementation, the method may further include: Step S17 of acquiring wear data of the vehicle in response to a travel mileage of the vehicle reaching a preset mileage.

The preset mileage may be set by a tester to control the unmanned vehicle to stop when the unmanned vehicle travels to the preset mileage on the test road.

The test platform may determine whether the travel mileage of the unmanned vehicle reaches the preset mileage, and in response to the travel mileage reaching the preset mileage, the unmanned vehicle may be controlled to stop traveling so as to finish the vehicle test. After stopping the vehicle test, the test platform may acquire the wear data of the vehicle, such as the degree of wear of various components of the vehicle.

Step S18 of determining a durability test result of the vehicle according to the wear data, the fault information, and the vehicle performance test result.

The test platform may determine the durability test result of the vehicle based on the wear data, the fault information, and the vehicle performance test result. For example, the test platform may determine a whole vehicle durability test result of the vehicle, such as a life span of the vehicle, for example, how many years or how many thousands of kilometers the vehicle can travel.

The wear data and the fault information may be used for determining the fatigue degree of each component. A plurality of vehicle performance test results may be included in the test process, and the plurality of vehicle performance test results may be used for determining the performance change of the vehicle, for example, whether the power performance of the vehicle is deteriorated, or whether a fuel consumption increment of the vehicle is greater than a threshold. The test platform may determine the whole vehicle durability test result of the vehicle according to the fatigue degree of each component of the vehicle and the performance change of the vehicle.

It should be noted that the durability test result may further include more detailed content, such as the life span of a component, which may be set according to a vehicle testing objective, and is not limited in the present disclosure.

Figure 6:
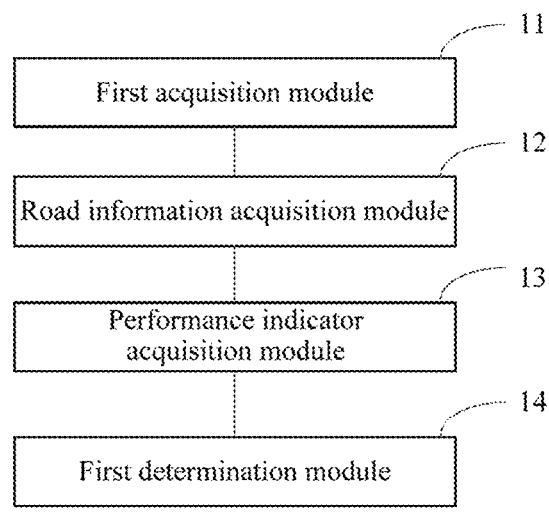
FIG. 6 illustrates a block diagram of a device for testing an unmanned vehicle based on a laser radar according to an embodiment of the present disclosure.

FIG. 6 illustrates a block diagram of a device for testing an unmanned vehicle based on a laser radar according to an embodiment of the present disclosure. The test device may refer to the test platform (test control system) described above, or the test device may refer to a device specifically carrying out the method for testing an unmanned vehicle in the test platform. As shown in FIG. 6, the device may include: a first acquisition module 11, configured to acquire point cloud data collected by a laser radar and vehicle motion information, the vehicle motion information including motion of the vehicle during travel; a road information acquisition module 12, configured to acquire road information of a test road where the vehicle is located according to the point cloud data and a map in response to the motion of the vehicle being a preset motion; a performance indicator acquisition module 13, configured to acquire a performance indicator of the vehicle according to the preset motion and the road information; and a first determination module 14, configured to determine a vehicle performance test result according to the vehicle motion information and the performance indicator.

By replacing the conventional manual vehicle test mode with the unmanned vehicle test mode in the present disclosure, and ensuring normal travel in the vehicle test based on a laser radar, according to the device for testing an unmanned vehicle based on a laser radar in this embodiment of the present disclosure, unmanned automatic test of the vehicle can be implemented, manpower is saved, and comprehensiveness and accuracy of the test can be ensured.

In one possible implementation, the preset motion may include one or more of the following: acceleration, deceleration, emergency braking, or steering, where the performance indicator may include one or more of the following: a power indicator, an emergency braking indicator, a control stability indicator, and the like.

In one possible implementation, the laser radar may be disposed on the vehicle, and there are one or more laser radars, where an included angle between a laser direction of the laser radar and a horizontal plane is of 0 to 50 degrees.

In one possible implementation, the laser direction of the laser radar is tilted downward by 10 degrees relative to the horizontal plane.

In one possible implementation, the unmanned vehicle travels on the test road using the laser radar; or the unmanned vehicle travels on the test road according to preconfigured motion information, where the preconfigured motion information includes a speed and a steering angle corresponding to each location on the test road, or the preconfigured motion information includes a speed and a steering angle corresponding to each time period in a test.

Figure 7:
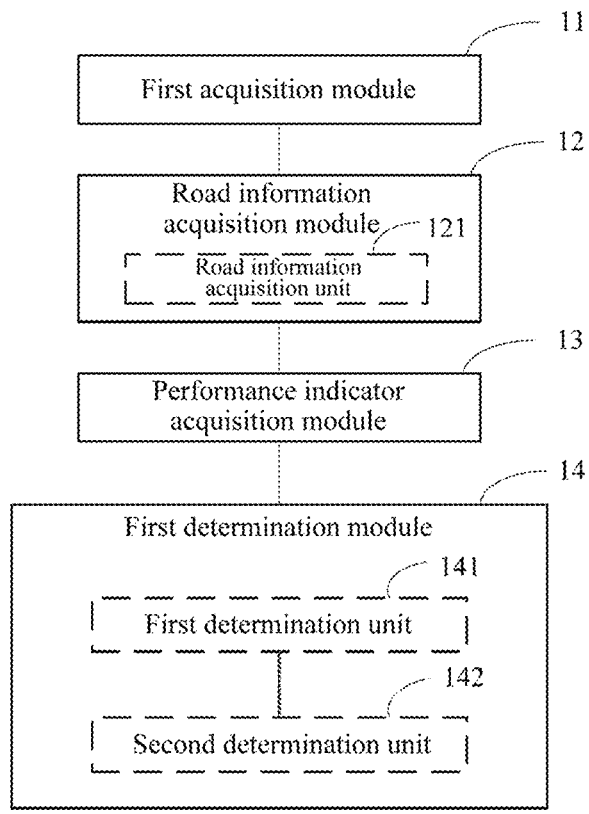
FIG. 7 illustrates a block diagram of a device for testing an unmanned vehicle based on a laser radar according to an embodiment of the present disclosure.

FIG. 7 illustrates a block diagram of a device for testing an unmanned vehicle based on a laser radar according to an embodiment of the present disclosure. The vehicle motion information may further include a vehicle motion parameter. As shown in FIG. 7, in one possible implementation, the first determination module 14 includes a first determination unit 141, configured to determine a performance parameter of the vehicle according to the vehicle motion parameter; and a second determination unit 142, configured to determine that the vehicle performance test result is qualified in response to the performance parameter of the vehicle meeting the performance indicator, where the vehicle motion parameter includes one or more of the following: a starting time of the preset motion, an ending time of the preset motion, a speed corresponding to the starting time, a speed corresponding to the ending time, a travel distance from the starting time to the ending time, a vehicle steering angle, or a vehicle steering radius.

As shown in FIG. 7, in one possible implementation, the road information acquisition module 12 may include: a road information acquisition unit 121, configured to determine a location of the vehicle on the test road according to the point cloud data and the map to acquire the road information corresponding to the location, where a correspondence between the road information and the location on the test road is preset; and the road information includes a road type.

Figure 8:
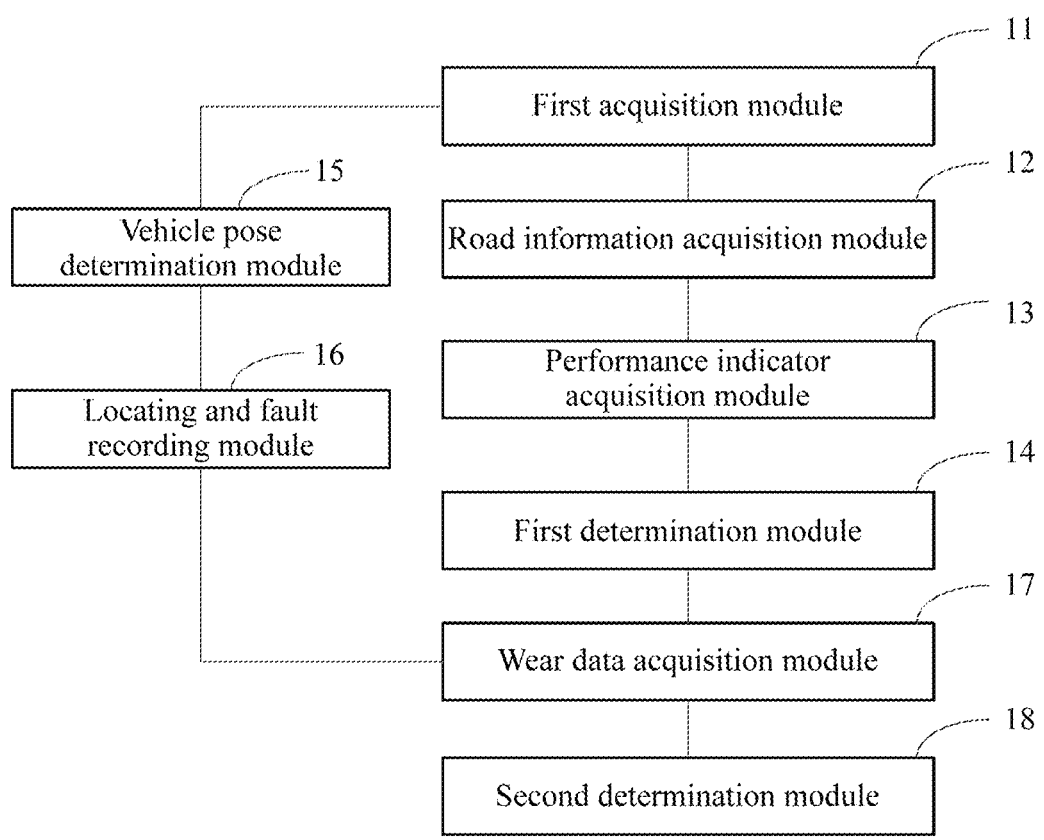
FIG. 8 illustrates a block diagram of a device for testing an unmanned vehicle based on a laser radar according to an embodiment of the present disclosure.

FIG. 8 illustrates a block diagram of a device for testing an unmanned vehicle based on a laser radar according to an embodiment of the present disclosure. As shown in FIG. 8, in one possible implementation, the device may further include: a vehicle pose determination module 15, configured to determine a vehicle pose according to the point cloud data and the map; and a locating and fault recording module 16, configured to locate the vehicle and record fault information, in response to a vehicle fault being determined according to the vehicle pose.

As shown in FIG. 8, in one possible implementation, the device may further include: a wear data acquisition module 17, configured to acquire wear data of the vehicle in response to a travel mileage of the vehicle reaching a preset mileage; and a second determination module 18, configured to determine a durability test result of the vehicle according to the wear data, the fault information, and the vehicle performance test result.

Figure 9:
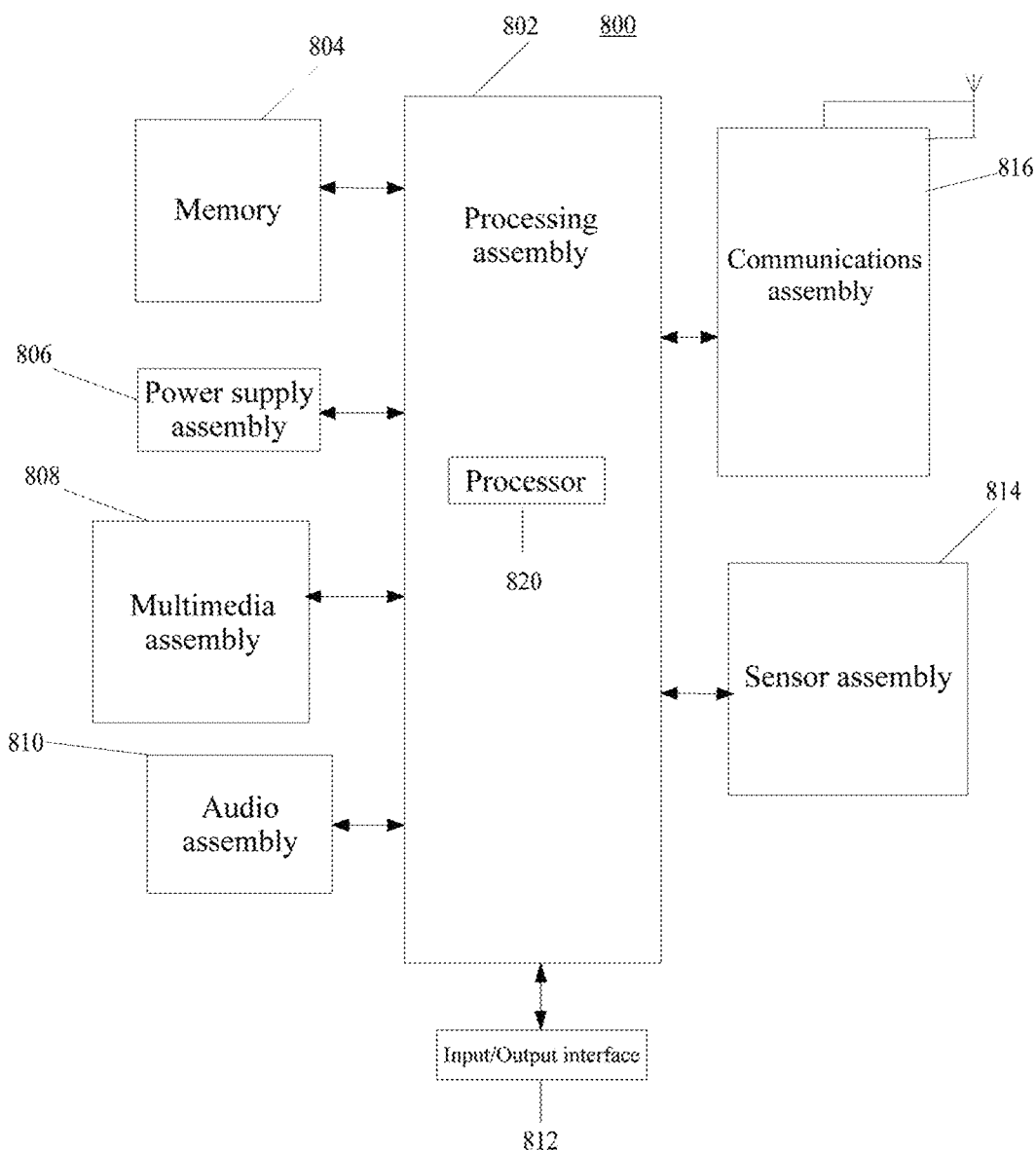
FIG. 9 illustrates a block diagram of a device 800 for testing an unmanned vehicle based on a laser radar according to an exemplary embodiment.

FIG. 9 is a block diagram of a device 800 for testing an unmanned vehicle based on a laser radar according to an exemplary embodiment. For example, the device 800 may be a mobile telephone, a computer, a digital broadcast terminal, a message transceiver device, a game console, a tablet device, a medical device, exercise equipment, a personal digital assistant, or the like.

Referring to FIG. 9, the device 800 may include one or more of the following components: a processing assembly 802, a memory 804, a power supply assembly 806, a multimedia assembly 808, an audio assembly 810, an input/output (I/O) interface 812, a sensor assembly 814, and a communications assembly 816.

The processing assembly 802 usually controls overall operations of the device 800, such as operations associated with display, telephone calls, data communication, camera operations, and recording operations. The processing assembly 802 may include one or more processors 820 to execute instructions, to perform all or some of the steps of the methods described above. In addition, the processing assembly 802 may include one or more modules to facilitate interaction between the processing assembly 802 and another assembly. For example, the processing assembly 802 may include a multimedia module to facilitate interaction between the multimedia assembly 808 and the processing assembly 802.

The memory 804 is configured to store various types of data to support operations on the device 800. Examples of such data include instructions for any application or method operated on the device 800, contact data, phonebook data, messages, pictures, videos, and the like. The memory 804 may be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power supply assembly 806 provides power for various components of the device 800. The power supply assembly 806 may include a power management system, one or more power supplies, and other assemblies associated with generation, management, and distributing of power for the device 800.

The multimedia assembly 808 includes a screen that provides an output interface between the device 800 and a user. In some embodiments, the screen may include a liquid crystal display (LCD) and a touch panel (TP). If the screen includes the touch panel, the screen may be implemented as a touch screen to receive input signals from a user. The touch panel includes one or more touch sensors to sense touch, slide, and gestures on the touch panel. The touch sensors may not only sense a boundary of a touch or slide motion, but also detect duration and pressure associated with the touch or slide operation. In some embodiments, the multimedia assembly 808 includes a front-facing camera and/or a rear-facing camera. When the device 800 is in an operating mode, such as a shooting mode or a video mode, the front-facing camera and/or the rear-facing camera may receive external multimedia data. Each front-facing camera or rear-facing camera may be a fixed optical lens system or have focusing and optical zoom capabilities.

The audio assembly 810 is configured to output and/or input audio signals. For example, the audio assembly 810 includes a microphone (MIC) configured to receive external audio signals when the device 800 is in an operating mode, such as a call mode, a recording mode, and a voice recognition mode. The received audio signal may be further stored in the memory 804 or sent by using the communications assembly 816. In some embodiments, the audio assembly 810 further includes a speaker configured to output audio signals.

The I/O interface 812 provides an interface between the processing assembly 802 and a peripheral interface module, which may be a keyboard, a click wheel, a button, or the like. These buttons may include, but not limited to: a home button, a volume button, a start button, and a lock button.

The sensor assembly 814 includes one or more sensors, configured to provide status assessment in various aspects for the device 800. For example, the sensor assembly 814 may detect an on/off status of the device 800 and relative positioning of components. For example, the components are a display and a keypad of the device 800. The sensor assembly 814 may further detect a change in a location of the device 800 or a component of the device 800, presence or absence of contact between the user and the device 800, orientation or acceleration/deceleration of the device 800, and a change in temperature of the device 800. The sensor assembly 814 may include a proximity sensor, configured to detect presence of an object nearby without any physical contact. The sensor assembly 814 may further include a light sensor, such as a CMOS or CCD image sensor, configured for use in an imaging application. In some embodiments, the sensor assembly 814 may further include an acceleration sensor, a gyro sensor, a magnetic sensor, a pressure sensor, or a temperature sensor.

The communications assembly 816 is configured to facilitate wired or wireless communication between the device 800 and another device. The device 800 may access a wireless network based on a communication standard, such as a WiFi, 2G or 3G network, or a combination thereof. In one exemplary embodiment, the communications assembly 816 receives broadcast signals or broadcast-related information from an external broadcast management system via a broadcast channel. In one exemplary embodiment, the communications assembly 816 further includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology, and another technology.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, and is configured to carry out the methods described above.

In an exemplary embodiment, a non-volatile computer-readable storage medium, such as the memory 804 including an computer program instruction, is further provided, and the computer program instruction may be executed by the processor 820 of the device 800 to complete the methods described above.

Figure 10:
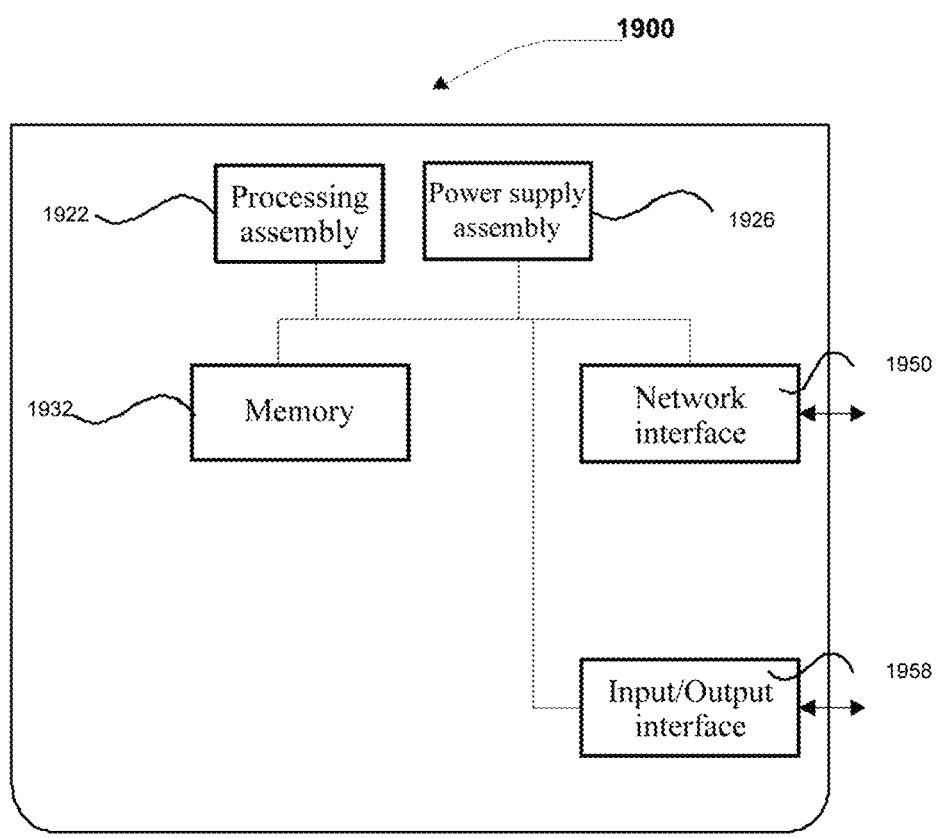
FIG. 10 illustrates a block diagram of a device 1900 for testing an unmanned vehicle based on a laser radar according to an exemplary embodiment.

FIG. 10 is a block diagram of a device 1900 for testing an unmanned vehicle based on a laser radar according to an exemplary embodiment. For example, the device 1900 may be provided as a server. Referring to FIG. 10, the device 1900 includes a processing assembly 1922, which further includes one or more processors, and a memory resource that is represented by a memory 1932 and that is configured to store an instruction executable for the processing assembly 1922, for example, an application. The application stored in the memory 1932 may include one or more modules with each corresponding to a set of instructions. In addition, the processing assembly 1922 is configured to execute instructions to carry out the methods described above.

The device 1900 may further include a power supply assembly 1926 configured to carry out power management of the device 1900, a wired or wireless network interface 1950 configured to connect the device 1900 to a network, and an input/output (I/O) interface 1958. The device 1900 may be operated based on an operating system stored in the memory 1932, such as Windows Server™, Mac OS X™, Unix™, Linux™, or FreeBSD™.

In an exemplary embodiment, a non-volatile computer-readable storage medium, such as the memory 1932 including a computer program instruction, is further provided. The computer program instruction may be executed by the processing assembly 1922 of the device 1900, to complete the methods described above.

The present disclosure may be a system, method, and/or computer program product. The computer program product may include a computer-readable storage medium loaded with computer-readable program instructions causing a processor to implement various aspects of the present disclosure.

The computer-readable storage medium may be a tangible device that may hold and store instructions for use by an instruction execution device. The computer-readable storage medium may be, for example but not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device, such as a punched card storing instructions therein or a convex structure in a groove, and any suitable combination thereof. As used herein, a computer-readable storage medium is not to be construed as an instantaneous signal itself, such as a radio wave or another freely propagating electromagnetic wave, an electromagnetic wave propagating through a waveguide or another transmission medium (for example, an optical pulse through a fiber optic cable), or an electrical signal transmitted through an electrical wire.

The computer-readable program instructions described herein may be downloaded from a computer-readable storage medium to various computing/processing devices or to an external computer or external storage device by using a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or network interface in each computing/processing device receives computer-readable program instructions from the network and forwards the computer-readable program instructions for storage in a computer-readable storage medium in each computing/processing device.

Computer program instructions for carrying out operations of the present disclosure may be assembly instructions, instruction set architecture (ISA) instructions, machine instructions, machine-related instructions, microcode, firmware instructions, state setting data, or source or object code written in any combination of one or more programming languages, including object-oriented programming languages such as Smalltalk and C++, and conventional procedural programming languages, such as the "C" language or similar programming languages. The computer-readable program instructions may be executed entirely on a user computer, partially on a user computer, as a stand-alone software package, partially on a user computer, partially on a remote computer, or entirely on a remote computer or server. In the case of a remote computer, the remote computer may be connected to the user's computer through any type of network, including a local area network (LAN) or a wide area network (WAN), or may be connected to an external computer (for example, through the Internet using an Internet service provider). In some embodiments, various aspects of the present disclosure are implemented by personalizing, using state information of computer-readable program instructions, an electronic circuit that can execute the computer-readable program instructions, such as a programmable logic circuit, a field programmable gate array (FPGA), or a programmable logic array (PLA).

Various aspects of the present disclosure are described herein with reference to flowcharts and/or block diagrams of methods, devices (systems), and computer program products according to the embodiments of the present disclosure. It should be understood that each block of the flowcharts and/or block diagrams, and combinations of blocks in the flowcharts and/or block diagrams, can be implemented by computer-readable program instructions.

These computer-readable program instructions may be provided to a processor of a general-purpose computer, a special-purpose computer, or another programmable data processing device, to produce a machine, so that the instructions, when executed by the processor of the computer or another programmable data processing device, produce devices for implementing the functions/actions specified in one or more blocks in the flowcharts and/or block diagrams. The computer-readable program instructions may alternatively be stored in a computer-readable storage medium, and cause a computer, a programmable data processing device, and/or other device to operate in a particular manner, so that the computer-readable medium storing instructions includes an article of manufacture including instructions that implement various aspects of the functions/actions specified in one or more blocks in the flowcharts and/or block diagrams.

The computer-readable program instructions may alternatively be loaded onto a computer, another programmable data processing device, or another device, to cause a series of operation steps to be carried out on the computer, another programmable data processing device, or another device, to produce a computer implemented process, so that the instructions executed on the computer, another programmable data processing device, or another device implement the functions/actions specified in one or more blocks in the flowcharts and/or block diagrams.

The flowcharts and block diagrams in the drawings illustrate the system architecture, functionality, and operation of possible implementations of systems, methods, and computer program products according to a plurality of embodiments of the present disclosure. In this regard, each block of the flowcharts or block diagrams may represent one module or a part of a program segment or instruction. The module or part of the program segment or instruction includes one or more executable instructions for implementing the specified logical functions. In some alternative implementations, the functions noted in the blocks may occur out of the order noted in the figures. For example, two consecutive blocks may in fact be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented by using a special purpose hardware-based system that carries out the specified functions or actions, or by using a combination of special-purpose hardware and computer instructions.

Various embodiments of the present disclosure have been described above, the foregoing description is exemplary, not exhaustive, and is not limited to the disclosed embodiments. Many modifications and variations will be apparent to a person of ordinary skill in the art without departing from the scope and spirit of the described embodiments. The choice of terminology used herein is intended to best explain the principles of the embodiments, practical application, or technical improvements to the technology in the marketplace, or to enable other people of ordinary skill in the art to understand the embodiments disclosed herein.

What is claimed is:

1. A method for testing an unmanned vehicle based on a laser radar, comprising:
    acquiring point cloud data and vehicle motion information, wherein the point cloud data is collected by a laser radar on the vehicle, the vehicle motion information including a motion of the vehicle during travel;
    acquiring road type information of a test road where the vehicle is located according to the point cloud data and a map in response to the motion of the vehicle being a preset motion, wherein the map being a map including a test road for testing the vehicle and a road type includes at least one of a highway, a cobbled road, a fish scale pit road, a washboard road, a Belgian road, a rough road, a swinging road, a broken road, a square pit, a standard ramp, a ring road, and a mountain road;
    acquiring a performance indicator of the vehicle according to the preset motion and the road type information, wherein a correspondence among the preset motion, the road type information, and the performance indicator of the vehicle is preset before testing and the performance indicator of the vehicle includes at least one of a time required accelerating to 100 kilometers per hour, a steering radius, a steering angle, and a braking distance for emergency braking; and
    determining a vehicle performance test result according to the vehicle motion information and the performance indicator,
    wherein said acquiring road type information of the test road where the vehicle is located according to the point cloud data and the map comprises:
        determining a location of the vehicle on the test road according to the point cloud data and the map to acquire the road type information corresponding to the location;
        wherein a correspondence between the road type information and the location on the test road is preset, and the road type information includes the road type;
        the preset motion comprises one or more of the following: acceleration, deceleration, emergency braking, or steering;
        the performance indicator includes one or more of the following: a power indicator, an emergency braking indicator, or a control stability indicator.

2. The method according to claim 1, wherein the vehicle motion information further comprises a vehicle motion parameter; and
    said determining a vehicle performance test result according to the vehicle motion information
    and the performance indicator includes:
        determining a performance parameter of the vehicle according to the vehicle motion parameter; and
        determining that the vehicle performance test result is qualified in response to the performance parameter of the vehicle meeting the performance indicator,
        wherein the vehicle motion parameter includes one or more of the following: a starting time of the preset motion, an ending time of the preset motion, a speed corresponding to the starting time, a speed corresponding to the ending time, a travel distance from the starting time to the ending time, a vehicle steering angle, or a vehicle steering radius.

3. The method according to claim 1, further comprising: determining a vehicle pose according to the point cloud data and the map.

4. The method according to claim 3, further comprising: locating the vehicle and recording fault information, in response to a vehicle fault being determined according to the vehicle pose.

5. The method according to claim 4, further comprising: acquiring wear data of the vehicle in response to a travel mileage of the vehicle reaching a preset mileage; and determining a durability test result of the vehicle according to the wear data, the fault information, and the vehicle performance test result.

6. The method according to claim 1, wherein the unmanned vehicle travels on the test road using the laser radar; or,
    the unmanned vehicle travels on the test road according to preconfigured motion information, wherein the preconfigured motion information includes a speed and a steering angle corresponding to each location on the test road, or the preconfigured motion information includes a speed and a steering angle corresponding to each time period in a test.

7. The non-volatile computer-readable storage medium according to claim 1, wherein the processor is further configured to:
    determine a vehicle pose according to the point cloud data and the map.

8. The non-volatile computer-readable storage medium according to claim 7, wherein the processor is further configured to:

locate the vehicle and recording fault information, in response to a vehicle fault being determined according to the vehicle pose.

9. The non-volatile computer-readable storage medium according to claim 8, wherein the processor is further configured to:
acquire wear data of the vehicle in response to a travel mileage of the vehicle reaching a preset mileage; and
determine a durability test result of the vehicle according to the wear data, the fault information, and the vehicle performance test result.

10. A device for testing an unmanned vehicle device based on a laser radar, comprising:
a processor; and
a memory configured to store processor-executable instructions, wherein the processor is configured to execute the executable instructions to implement operations comprising:
acquiring point cloud data and vehicle motion information, wherein the point cloud data is collected by a laser radar on the vehicle, the vehicle motion information including a motion of the vehicle during travel;
acquiring road type information of a test road where the vehicle is located according to the point cloud data and a map in response to the motion of the vehicle being a preset motion, wherein the map being a map including a test road for testing the vehicle and a road type includes at least one of a highway, a cobbled road, a fish scale pit road, a washboard road, a Belgian road, a rough road, a swinging road, a broken road, a square pit, a standard ramp, a ring road, and a mountain road;
acquiring a performance indicator of the vehicle according to the preset motion and the road type information, wherein a correspondence among the preset motion, the road type information, and the performance indicator of the vehicle is preset before testing and the performance indicator of the vehicle includes at least one of a time required accelerating to 100 kilometers per hour, a steering radius, a steering angle, and a braking distance for emergency braking; and
determining a vehicle performance test result according to the vehicle motion information and the performance indicator,
wherein said acquiring road type information of the test road where the vehicle is located according to the point cloud data and the map comprises:
determining a location of the vehicle on the test road according to the point cloud data and the map to acquire the road type information corresponding to the location;
wherein a correspondence between the road type information and the location on the test road is preset, and the road type information includes the road type;
the preset motion comprises one or more of the following: acceleration, deceleration, emergency braking, or steering;
the performance indicator includes one or more of the following: a power indicator, an emergency braking indicator, or a control stability indicator.

11. The device according to claim 10, wherein the vehicle motion information further comprises a vehicle motion parameter; and
said determining a vehicle performance test result according to the vehicle motion information and the performance indicator includes:
determining a performance parameter of the vehicle according to the vehicle motion parameter; and
determining that the vehicle performance test result is qualified in response to the performance parameter of the vehicle meeting the performance indicator,
wherein the vehicle motion parameter includes one or more of the following: a starting time of the preset motion, an ending time of the preset motion, a speed corresponding to the starting time, a speed corresponding to the ending time, a travel distance from the starting time to the ending time, a vehicle steering angle, or a vehicle steering radius.

12. The device according to claim 10, wherein the processor is further configured to:
determine a vehicle pose according to the point cloud data and the map.

13. The device according to claim 12, wherein the processor is further configured to:
locate the vehicle and recording fault information, in response to a vehicle fault being determined according to the vehicle pose.

14. The device according to claim 13, wherein the processor is further configured to:
acquire wear data of the vehicle in response to a travel mileage of the vehicle reaching a preset mileage; and
determine a durability test result of the vehicle according to the wear data, the fault information, and the vehicle performance test result.

15. The device according to claim 10, wherein the unmanned vehicle travels on the test road using the laser radar; or,
the unmanned vehicle travels on the test road according to preconfigured motion information, wherein the preconfigured motion information includes a speed and a steering angle corresponding to each location on the test road, or the preconfigured motion information includes a speed and a steering angle corresponding to each time period in a test.

16. A non-volatile computer-readable storage medium, storing computer program instructions therein, wherein the computer program instructions, when executed by a processor, implement operations comprising:
acquiring point cloud data and vehicle motion information, wherein the point cloud data is collected by a laser radar on the vehicle, the vehicle motion information including a motion of the vehicle during travel;
acquiring road type information of a test road where the vehicle is located according to the point cloud data and a map in response to the motion of the vehicle being a preset motion, wherein the map being a map including a test road for testing the vehicle and a road type includes at least one of a highway, a cobbled road, a fish scale pit road, a washboard road, a Belgian road, a rough road, a swinging road, a broken road, a square pit, a standard ramp, a ring road, and a mountain road;
acquiring a performance indicator of the vehicle according to the preset motion and the road type information, wherein a correspondence among the preset motion, the road type information, and the performance indicator of the vehicle is preset before testing and the performance indicator of the vehicle includes at least one of a time required accelerating to 100 kilometers per hour, a steering radius, a steering angle, and a braking distance for emergency braking; and
determining a vehicle performance test result according to the vehicle motion information and the performance indicator, wherein said acquiring road type information of the test road where the vehicle is located according to the point cloud data and the map comprises:
  determining a location of the vehicle on the test road according to the point cloud data and the map to acquire the road type information corresponding to the location;
  wherein a correspondence between the road type information and the location on the test road is preset, and the road type information includes the road type;
  the preset motion comprises one or more of the following: acceleration, deceleration, emergency braking, or steering;
  the performance indicator includes one or more of the following: a power indicator, an emergency braking indicator, or a control stability indicator.

17. The device according to claim 16, wherein the unmanned vehicle travels on the test road using the laser radar; or, the unmanned vehicle travels on the test road according to preconfigured motion information, wherein the preconfigured motion information includes a speed and a steering angle corresponding to each location on the test road, or the preconfigured motion information includes a speed and a steering angle corresponding to each time period in a test.

18. The non-volatile computer-readable storage medium according to claim 16, wherein the unmanned vehicle travels on the test road using the laser radar; or, the unmanned vehicle travels on the test road according to preconfigured motion information, wherein the preconfigured motion information includes a speed and a steering angle corresponding to each location on the test road, or the preconfigured motion information includes a speed and a steering angle corresponding to each time period in a test.

* * * * *